United States Patent
Kawaguchi

(10) Patent No.: US 8,356,140 B2
(45) Date of Patent: Jan. 15, 2013

(54) METHODS AND APPARATUS FOR CONTROLLING DATA BETWEEN STORAGE SYSTEMS PROVIDING DIFFERENT STORAGE FUNCTIONS

(75) Inventor: Tomohiro Kawaguchi, Cupertino, CA (US)

(73) Assignee: Hitachi, Ltd., Tokyo (JP)

( * ) Notice: Subject to any disclaimer, the term of this patent is extended or adjusted under 35 U.S.C. 154(b) by 228 days.

(21) Appl. No.: 12/838,688

(22) Filed: Jul. 19, 2010

(65) Prior Publication Data
US 2012/0017061 A1    Jan. 19, 2012

(51) Int. Cl.
*G06F 12/06* (2006.01)
(52) U.S. Cl. .................. 711/114; 711/165; 711/E12.084
(58) Field of Classification Search .................. None
See application file for complete search history.

(56) References Cited

U.S. PATENT DOCUMENTS

| | | | |
|---|---|---|---|
| 7,228,380 B2 | 6/2007 | Yamamoto et al. | |
| 7,386,598 B2 | 6/2008 | Mannen et al. | |
| 7,581,061 B2 * | 8/2009 | Miyagaki et al. | 711/114 |
| 2005/0144173 A1 | 6/2005 | Yamamoto et al. | |
| 2006/0015697 A1 * | 1/2006 | Morishita et al. | 711/162 |
| 2006/0047906 A1 * | 3/2006 | Umemura | 711/114 |
| 2006/0047923 A1 * | 3/2006 | Kodama | 711/161 |
| 2006/0101169 A1 * | 5/2006 | Shiga et al. | 710/36 |
| 2007/0271434 A1 * | 11/2007 | Kawamura et al. | 711/165 |
| 2009/0240898 A1 * | 9/2009 | Abe et al. | 711/154 |
| 2010/0070722 A1 | 3/2010 | Otani et al. | |

* cited by examiner

*Primary Examiner* — Charles Rones
*Assistant Examiner* — Nathan N Sadler
(74) *Attorney, Agent, or Firm* — Hitachi America, Ltd.

(57) ABSTRACT

A system comprises a plurality of storage systems, which provides different storage functions, and is controlled by a management server. The management server determines whether to change the control of the storage controller between the storage systems, or to mount the target volume as an external volume and keep the storage controller under control so that the storage function provided to the source volume is maintained even after the configuration change between the storage systems. After the determination, the management server instructs the storage system to perform according to the determination.

15 Claims, 12 Drawing Sheets

| Vol# | Capacity | Applied Function | | | |
|---|---|---|---|---|---|
| | | Local Copy | Remote Copy | Compression | Encryption |
| 0 | 500GB | X | | | X |
| 1 | 500GB | X | | | |
| 2 | 200GB | X | X | | X |
| 3 | 200GB | X | X | | |
| 4 | 400GB | | X | | |
| 5 | 400GB | | | | |
| 6 | 400GB | | | X | X |
| 7 | 400GB | | | X | |

Fig. 2

| Function | Licensed Capacity | Used Capacity |
|---|---|---|
| Local Copy | 10TB | 1.4TB |
| Remote Copy V02 | 10TB | 1.2TB |
| Compression | 3TB | 0.8TB |
| Encryption | 3TB | 1.1TB |

Fig. 3A

| Function | Licensed Capacity | Used Capacity |
|---|---|---|
| Local Copy V01 | 10TB | 1.4TB |
| Remote Copy | 8TB | 1.2TB |

Fig. 3B

| Function | Compatibility |
|---|---|
| Local Copy | None |
| Remote Copy V01 | None |
| Remote Copy V02 | Remote Copy V01 |
| Remote Copy V03 | Remote Copy V01,02 |
| Compression | None |
| Encryption | None |

Fig. 4

| Host | Storage |
|------|---------|
| 0 | 0,1,2 |
| 1 | 0,1,2 |
| 2 | 0,1,2,3,4,5 |
| 3 | 0,1,2,3,4,5 |
| 4 | 4,5 |
| 5 | 4,5 |

Fig. 5

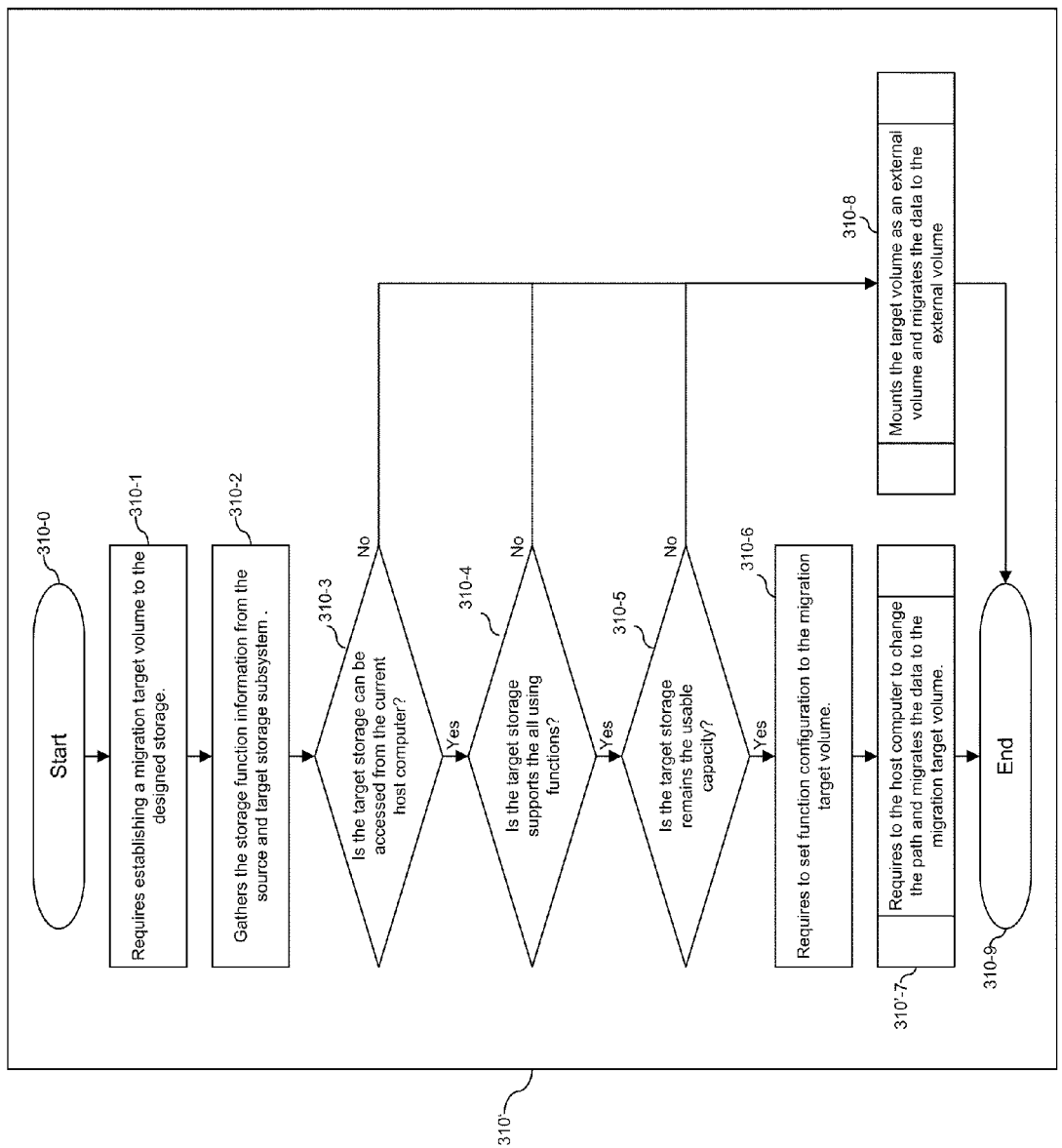

METHODS AND APPARATUS FOR CONTROLLING DATA BETWEEN STORAGE SYSTEMS PROVIDING DIFFERENT STORAGE FUNCTIONS

BACKGROUND OF THE INVENTION

This invention is related to method and apparatus to controlling data between heterogeneous storage systems.

To achieve scalability for storage systems, "Scale-up" architecture and "Scale-out" architecture are generally used. Scale-up architecture can expand the system scale by installing storage components, for instance, controllers, cache memory, ports and disks. On the other hand, scale-out architecture can expand the system scale by connecting a plural of storage modules. Storage module includes controllers, cache memory, ports and disks. Such examples are disclosed in US2005/0144173A1, US2010/0070722A1. In scale-out architecture environment, the storage module may execute data migration function between two or more storage modules. This function is useful for storage replacing and load balancing, but is not applicable in cases where the storage system including the source volume has the data copy function, however where an other storage system including the target volume does not have the corresponding function. In addition, even where both storage systems have the data copy function, between heterogeneous storage systems data migration may not be performed because of the compatibility.

U.S. Pat. No. 7,386,598 discloses a method of creating a copy of a virtualized storage region. The server determines whether the storage unit system is capable of performing the copying operation, and if not the server would write the data onto the storage unit.

U.S. Pat. No. 7,228,380 discloses a method to connect a first storage system and second storage system, and provide the volumes in the second storage system to the host as external device of the first storage system. The storage connects external storages, mounts volumes of the external storage and provides a virtual volume by storing data to the external storage volume.

However, this method requires storage resources, such as ports, cache memory and processor time, of the first storage system to control the external volume compared to using the data migration function, which would not require storage resource of the first storage system after the data migration including the change of connection between the host and the storage system is completed.

SUMMARY OF THE PRESENT INVENTION

Exemplary embodiments of the invention provide a system comprising a plurality of storage systems providing different storage functions and are managed by a management program controlling the data migration between the storage systems. The control of data for the whole system is effectuated by selecting the control between the storage systems based on information of the storage functions of each storage system subject as a source and target.

In one embodiment, the management program migration program gathers information on storage functions available on both first and second storage systems, and determines whether to change control of data subject to migration from said first controller to said second controller, or to mounting a volume of the second storage system as an external volume to the first storage system based on the gathered information.

BRIEF DESCRIPTION OF THE DRAWING

FIG. 2 illustrates an example of a Volume Information Table 121 in the storage subsystem 100 of FIG. 1.

FIG. 3A illustrates an example of a Function Information Table 122 in the storage subsystem 100 of FIG. 1.

FIG. 3B illustrates an example of a Function Information Table 222 in the storage subsystem 200 of FIG. 1.

FIG. 4 illustrates an example of a Storage Management Table 321 in the Migration Management Server 300 of FIG. 1.

FIG. 5 illustrates an example of a Network Management Table 322 in the Migration Management Server 300 of FIG. 1.

FIG. 11 illustrates an example of a migration management sequence 310' in the Migration Management Server 300 of FIG. 10.

DETAILED DESCRIPTION OF A PREFERRED EMBODIMENT OF THE PRESENT INVENTION

First Embodiment

Figure 1:
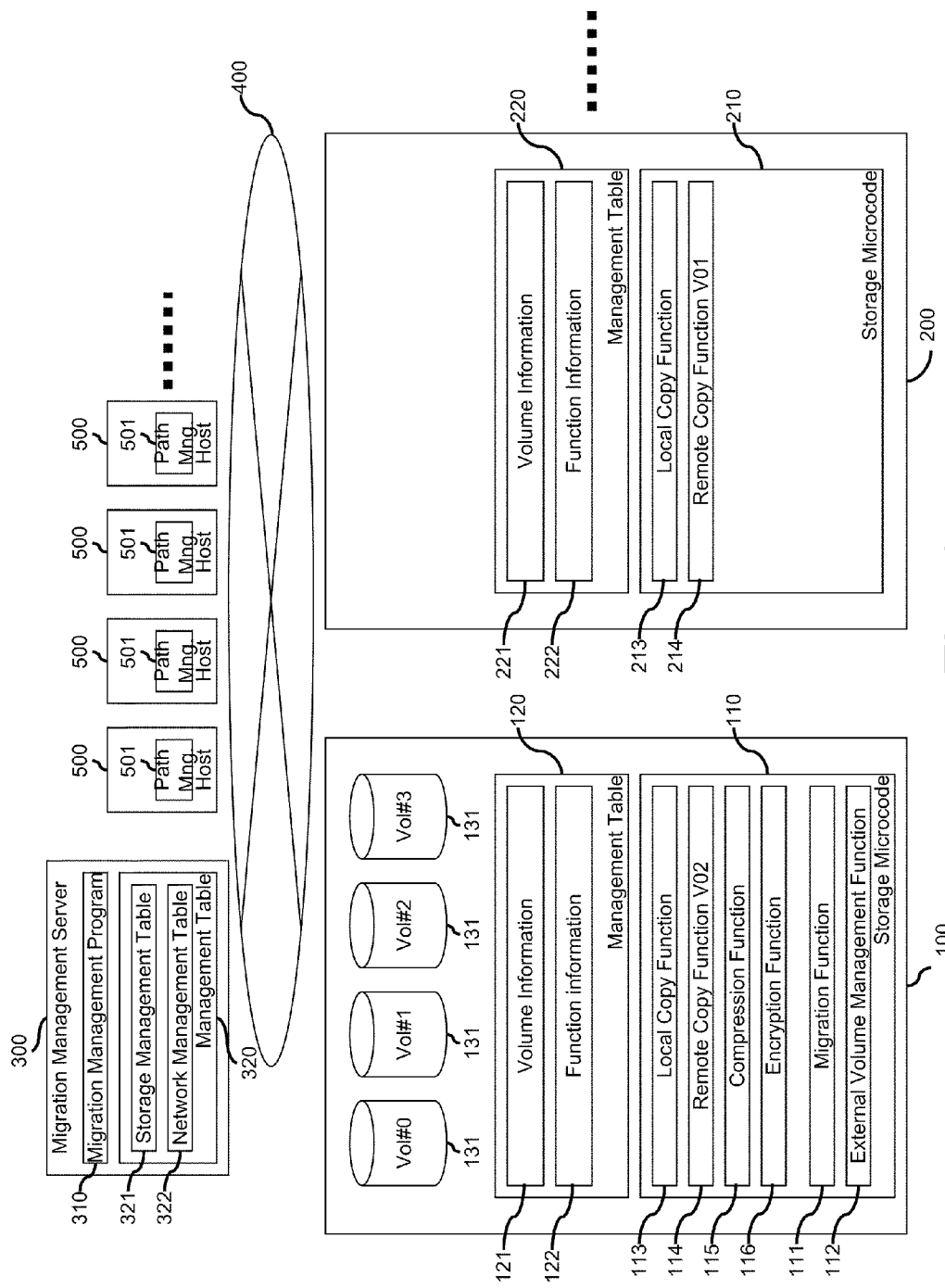
FIG. 1 illustrates an example of overview of a configuration of an invention.

FIG. 1 illustrates the configuration of a system in which the method and apparatus of the invention may be applied. Storage subsystems 100, 200 are connected via a network 400 to host computers 500. The network 400 may be SAN (storage area network), or TCP/IP (transmission control protocol/internet protocol) networks. The storage subsystem 100 receives I/O commands from the host computers 500 and provides storage volumes 131 to the host computers 500.

The host computers 500 include a CPU, a memory, and an interface. The CPU reads programs stored in the memory and executes the programs. Programs include applications, operating systems (OS) and a Path Management Software 501. The Path Management Software 501 changes the network path to storage subsystems for migration or against a path failure.

The storage subsystem 100, 200 includes a storage controller that includes a CPU, a memory, storage interfaces, and disk interface. The CPU controls the storage subsystem 100, 200, and reads microcodes 110, 210 and tables 120, 220 from the memory. The memory stores the microcodes 110, 210 and tables 120, 220. The storage interface connects with a plurality of host computers 500 via a storage network 400. The storage interface of the storage subsystem 100 connects with a storage interface of the storage subsystem 200. The disk interface connects with a plurality of storage devices stored in a disk unit, which may be inside the storage subsystem or external and coupled to the storage subsystem. The storage devices are comprised of solid-state devices, such as flash memories, and/or hard disk drives (HDD), for storing data.

The Management Table 120, 220 stored in the memory of the storage subsystem includes a Volume Information Table 121, 221 and Function Information Table 122, 222. A Volume Information Table 121, 221 provides logical volume configuration information for each storage volume 131 within the storage subsystem. A Function Information Table 122, 222 provides information on the functions provided for the storage subsystem. Functions provided for each storage subsystem are realized by CPU's execution of programs stored in the Storage Microcode 110, 210. In this example, storage subsystem 100 has programs to perform Migration Function 111, External Volume Management Function 112, Local Copy Function 113, Remote Copy Function 114, Compression Function 115, and Encryption Function 116. The storage subsystem 200 has programs to perform Local Copy Function 213 and Remote Copy Function 214. The program for Migration Function 111 migrates a volume between storage subsystems and changes the path from the host computer 500 which the source storage volume was originally provided. The program for External Volume Management Function 112 mounts volumes of other storage subsystems as external volumes, which are provided as its storage volumes to host computers. The program for Local Copy Function 113 copies data of a volume to a volume in the same storage subsystem. Volumes include internal volumes that are allocated to storage devices within the storage system and external volumes that are allocated to storage devices external to the storage system. The program for Remote Copy Function 114 copies data of a volume to a volume of an other storage subsystem. The program for Compression Function 115 compressed data of a volume. The program for Encryption Function 116 encrypts data written to a volume and decrypts data read from a volume.

The program for Migration Function 111, which also changes the control of the storage controller from one inside the storage subsystem to another one outside of the storage subsystem, may not be applicable because of the configuration of the storage subsystems 100, 200. This is because migration of a volume using this function would require management of a volume by a different storage system. For example, if the host accessing the source volume of the storage subsystem 100 is not physically connected to the target volume of the storage subsystem 200, unless the accessibility is solved, the volume should not be migrated. In addition, if a function used for the source volume of the storage subsystem 100 cannot be provided by the storage subsystem 200 for the target volume, the migration function should not be used.

The program for External Volume Management Function 112 would solve this problem because the control of the target volume is kept by the migration source storage subsystem. On the other hand, it would require control by the controller in the original storage subsystem 100, thus it does not spread the CPU load balance to the other storage subsystem and may not be efficient as a system as a whole because migration maybe performed to a newer storage system having upgraded hardware including CPU, storage devices. Thus, in this embodiment in order to use the resources efficiently and maintain the functions available to the user even after the migration, the Migration Management Server would determine which function to use in order to migrate the data between volumes of different storage systems.

The Migration Management Server 300 manages the migration process and includes a CPU, a memory, and an interface. The CPU reads program 310 and tables 321, 322 of management table 320 from the memory. The memory stores the program 310, and tables 321, 322. The Migration Management Program 310 controls volume migration between the storage subsystems. In this example, the source volume 131 would be migrated from storage subsystem 100 to storage subsystem 200. The Storage Management Table 311 includes information of storage microcode compatibility. It may also have a copy of the management information 120, 220 of the storage subsystem 100, 200. The Network Management Table 312 includes information of reachable network relation between storages subsystems 100,200 and host computers 500.

FIG. 2 illustrates an example of a Volume Information Table 121 in the storage subsystem 100 of FIG. 1. The Volume Information Table 121 provides logical volume configuration. The Volume Information Table 121 includes columns of the Volume Number 121-1 as the ID of the volume, Capacity 121-2 representing the capacity of volume, and Applied Function 121-3 representing the functions used for the volume. For example, Volume 1 is using Local Copy and Encryption Function, while Volume 4 is using Remote Copy. The Volume Information Table 221 in the storage subsystem 200 of FIG. 1 includes the same columns, but reflects its information of storage volumes provided by its controller to the host computers.

FIG. 3A illustrates an example of a Function Information Table 122 of FIG. 1. The Function Information Table 122 includes columns of the Function Name 122-1 representing the name of a function, Licensed Capacity 122-2 representing the total available capacity for the function for the storage subsystem 100, and Used Capacity 122-3 representing the already used capacity of the function for the storage subsystem 100. The External Volume Error Check Code Table 112-11-3 further includes Error Check Code 112-11-3-3 representing the error check code of the external volume, which is the calculated hash value of the data in the slot. Thus, the Local Copy Function stored in the storage subsystem 100 is using 1.4 terabits of it's a licensed capacity of 10 terabits, and is capable of providing up to 8.6 terabits for the storage system 100.

FIG. 3B illustrates an example of a Function Information Table 222 of FIG. 1. The Function Information Table 222 includes columns of the Function Name 222-1 representing the name of a function, Licensed Capacity 222-2 representing the total available capacity for the function for the storage subsystem 200, and Used Capacity 222-3 representing the already used capacity of the function for the storage subsystem 200. Because there is no encryption function, compression function available in this storage subsystem 200, there is no corresponding line for that function in this storage subsystem 200.

FIG. 4 illustrates an example of a Storage Management Table 321 of FIG. 1. The Storage Management Table 321 includes columns of the Function Name 321-1 representing the name of a function, and Compatibility Information 321-2 representing the information of the compatible function names. Thus, the Remote Copy V02, V03 are compatible to the previous versions the Remote Copy V01, V01 and V02, respectively, it is not compatible vice versa.

FIG. 5 illustrates an example of a Network Management Table 322 of FIG. 1. The Network Management Table 322 includes columns of the Host Computer ID 322-1 representing the ID of a host computer, and Storage ID 322-2 representing the information of the reachable storage IDs from the host computer. Storage IDs are identical to each storage subsystem. In some systems, product numbers and/or serial numbers may be used for Storage IDs. Here, the network allows the host computer ID 2, 3 to access storage subsystems 0,1, 2,3,4,5, while access is limited to storage subsystems 0,1,2 for the host computer ID 0,1. Thus, the storage subsystem 100, 200 shown in FIG. 1, which is represented by storage ID, 1,2 are only accessible from host computer having ID 0-3. Accessibility may be controlled by zoning or actual physical connectability.

Figure 6:
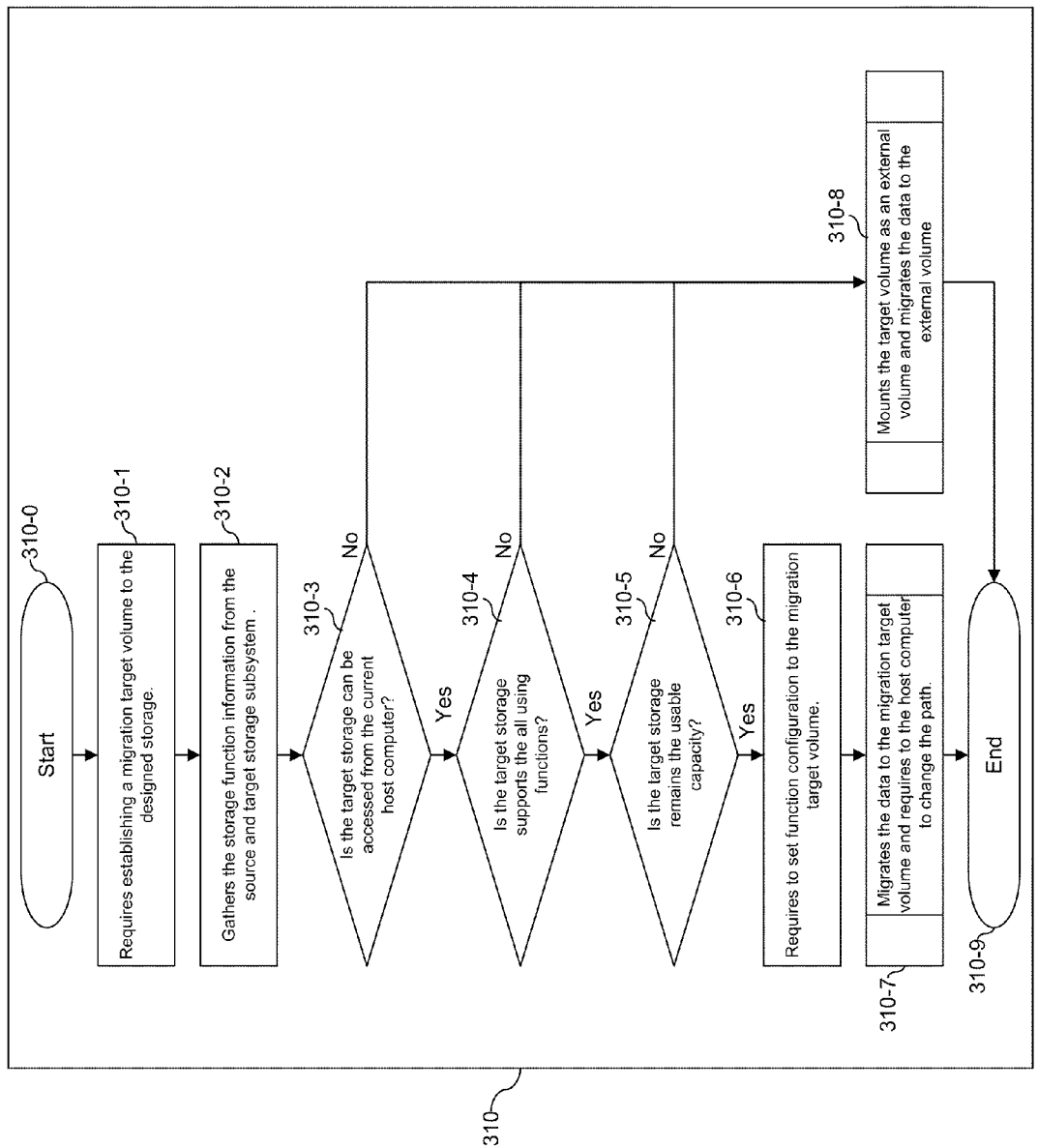
FIG. 6 illustrates an example of a migration management sequence 310 in the Migration Management Server 300 of FIG. 1.

FIG. 6 illustrates an example of a process flow of the Migration Management Program 310 in the Migration Management Server 300 of FIG. 1. This program may be executed by an user request, or by determination that the load, capacity of the storage subsystem 100 is above a predetermine level. The program starts at 310-0. In step 310-1, the program establishes a migration target volume in storage subsystem 200. In step 310-2, the program gathers storage function information from storage subsystem 100 and 200. Thus, the information stored in Volume Information Table 121 and Function Information Table 222 is read to the Migration Management Server 300. In step 310-3, the program checks the path relation between the migration target volume and the host computer. The information stored in Network Management Table 322 used to determine whether the migration target volume is accessible from the host computers that accessed the migration source volume. If the path exists, the program proceeds to Step 310-4. If the path does not exist, the program proceeds to Step 310-8.

In step 310-4, the program checks whether the storage functions used in the migration source volume may be supported by the functions in Storage Subsystem 200. The information stored in Volume Information Table 121, Storage Management Table 321 and Function Information Table 222 used to determine whether the target volume could support the storage functions used in the source volume. The function applied to the migration source volume is stored in Volume Information Table 121. These function needs to be provided by the controller in the storage subsystem 200 in order to migration the volume to a target that is not controlled by the same storage controller. Thus, the storage subsystem 200 must possess the storage function or a compatible storage function in its Storage Microcode 210. If the functions can be provided by the storage subsystem 200, the program proceeds to Step 310-5, else proceeds to Step 310-8. For example, Volume Information Table 121 shows that Local Copy and Encryption Function are applied to Volume number 0. However, because storage subsystem 200 does not have an Encryption Function as shown in Function Information Table 220, the target storage system is not capable of controlling the data of Volume number 0. Volume Information Table 121 also shows that Local Copy and Remote Copy Function V02 are applied to Volume number 3. The Function Information Table 222 shows that Local Copy Function and Remote Copy Function V01 may be applied in the storage subsystem 200. According to Storage Management Table 321, Remote Copy V01 is not compatible to Remote Copy V02. Thus, although storage controller of the storage subsystem 200 may provide Local Copy to the target volume, it would not be able to provide the Remote Copy that was applied to the source volume by the storage controller in the storage subsystem 100.

In step 310-5, the program checks whether the migration target volume has sufficient capacity to provide the storage functions provided by the source volume at the storage subsystem 200. The information stored in Function Information 222, is obtained for at least the storage functions that have to be succeeded to the target volume. If the capacity of the source volume subject to migration is equal or smaller than the licensed capacity subtracted by the already used capacity in the storage subsystem 200, then the storage system would be able to provide the storage function to the target volume. However, if the capacity of the source volume subject to migration is larger than the licensed capacity subtracted by the already used capacity in the storage subsystem 200, then the storage system would not be able to provide the storage function to the target volume because it would violate the license or cannot fully operate the function. Thus, in the former case, the storage functions can be succeeded to the target volume and the program proceeds to step 310-6. In the latter case, where there is any storage functions that can not be succeeded to the target volume, the program proceeds to step 310-8 so that the storage controller in the storage subsystem 100 keeps the control of the storage function and treats the target volume as an external volume. For example, Volume Information Table 121 shows that Local Copy is applied to Volume number 1 and the capacity of the volume is 500 GB. The Function Information Table 222 shows that Local Copy Function in the storage subsystem 200 can execute up to 8.6 TB. Thus, the storage controller of the storage subsystem 200 can provide the function applied to the Volume number 1.

In step 310-6, the program send request to the storage controller of the storage subsystem 200 to set up the functions used in the source volume to the target volume. The storage controller of the storage subsystem 200 would also modify the Volume Information Table 221. Then, the program proceeds to step 310-7.

In step 310-7, the program calls the Migration Function 111 to copy data of the source volume to the target volume, and to change the host path from the source volume to the target volume. Then, the program proceeds to step 310-9.

In step 310-8, the program calls External Volume Management Function 112 to change the attribution of the source volume to a virtual volume, and to mount the target volume to the virtual volume. The data migration from the source volume to the target volume can be conducted before the mounting or after the mounting. Then, the program proceeds to step 310-9. The program ends at step 310-9.

Figure 7:
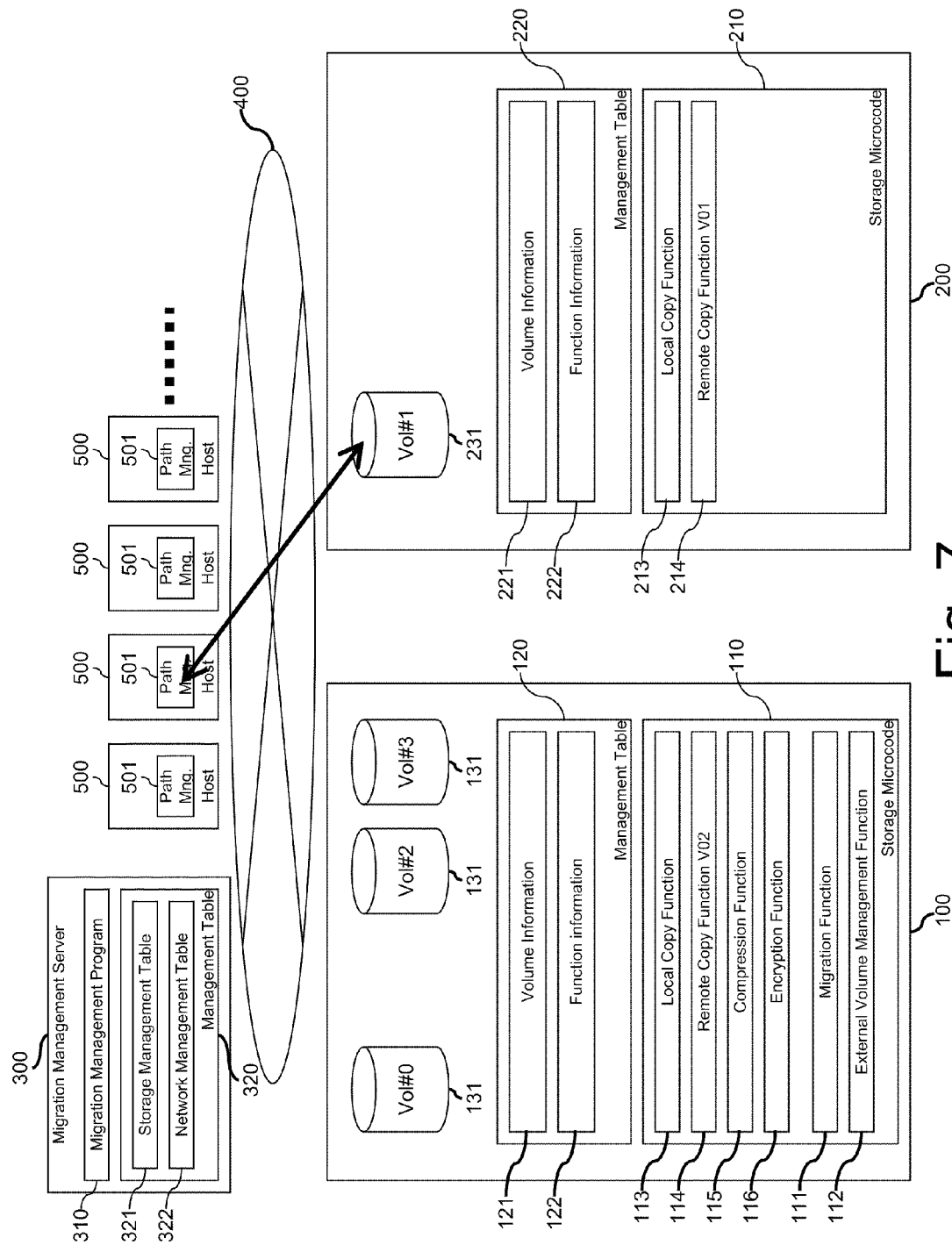
FIG. 7 illustrates an example of a configuration of the invention after the migration.

FIG. 7 illustrates an example of a diagram showing the system configuration of the migration. The volume subject to migration is Volume number 1, which only the Local Copy Function is applied. In this case, the target volume, Volume 231, is established by step 310-1 and the function configuration would be set for Volume 231 being subject to Local Copy Functions according to step 310-6. The source volume would be migrated to the target volume. The path from the Host computer 500 is changed from Volume 131 in the storage subsystem 100 to Volume 231 in the storage subsystem 200 according to step 310-7.

Figure 8:
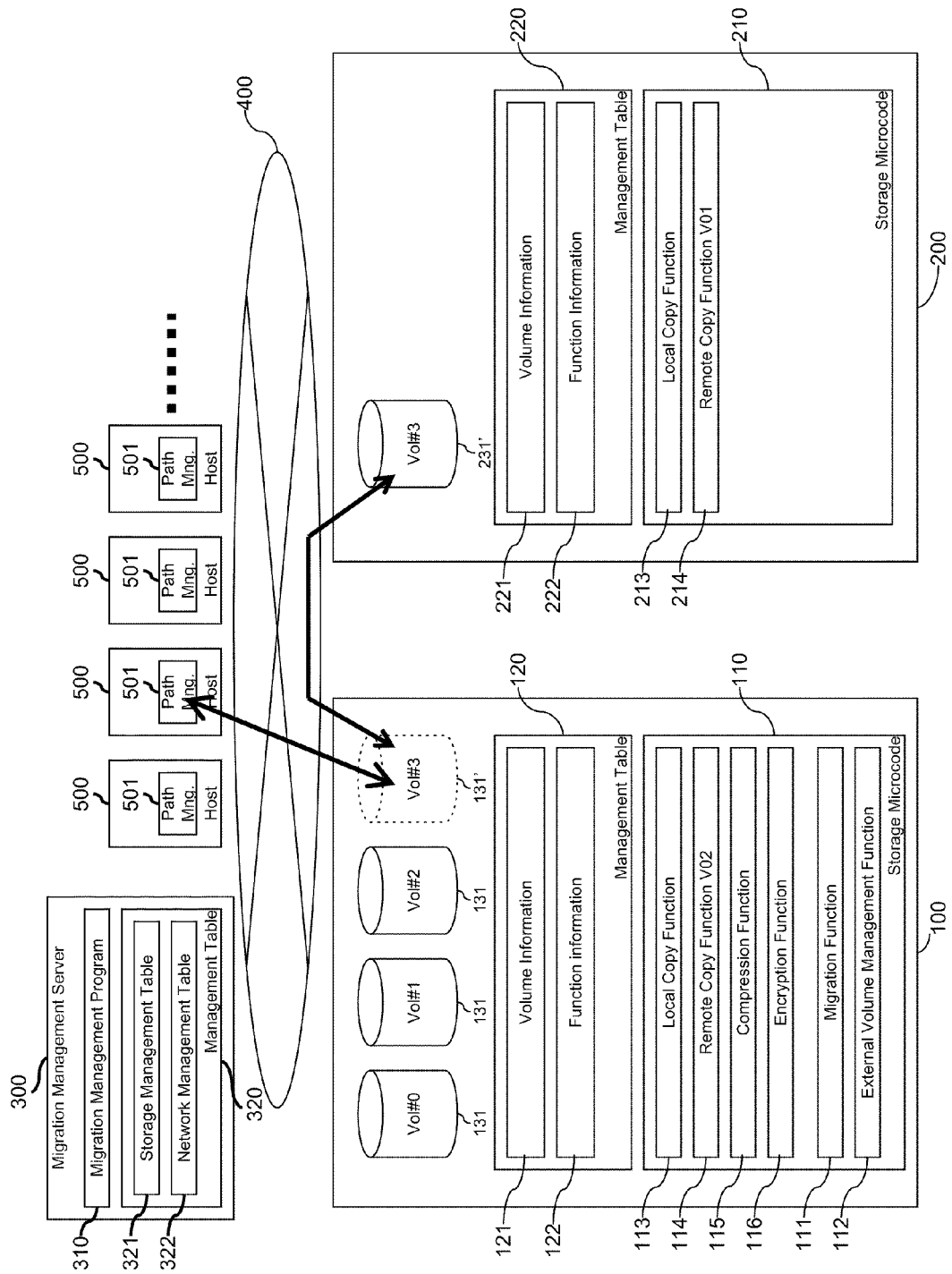
FIG. 8 illustrates an example of a configuration of the invention after the migration.

FIG. 8 illustrates an example of a diagram showing the system configuration of the mounting of volume in the storage subsystem 200 to the volume in the storage subsystem 100 as an external volume. The volume, Volume number 3, is determined that it cannot be migrated because one of the function applied to the volume (i.e. Remote Copy Function) cannot be provided by the storage subsystem 200. Thus, the Volume 231' established according to step 310-1 would be mounted as an external volume using the External Volume Management Function 112. There would be no direct path from the Host computer 500 and the I/O commands would be processed by the storage controller in the storage subsystem 100. The status of Volume 131' would be changed from a physical volume to a virtual volume and the Volume 131' would be connected to the Host computer 500 and the Volume 231'. The data received from the Host computer 500 would be actually written to Volume 231.

Second Embodiment

While in the first embodiment, the Migration Management Server 300 manages whether to apply the migration function or the external volume management function based on the information it gathered, and gives instructions to the storage subsystems 100, 200 according to the determination, the second embodiment demonstrates that the management is managed by the management program 310 within the storage subsystem 100. Only the differences with the first embodiment will be explained by using FIG. 9.

Figure 9:
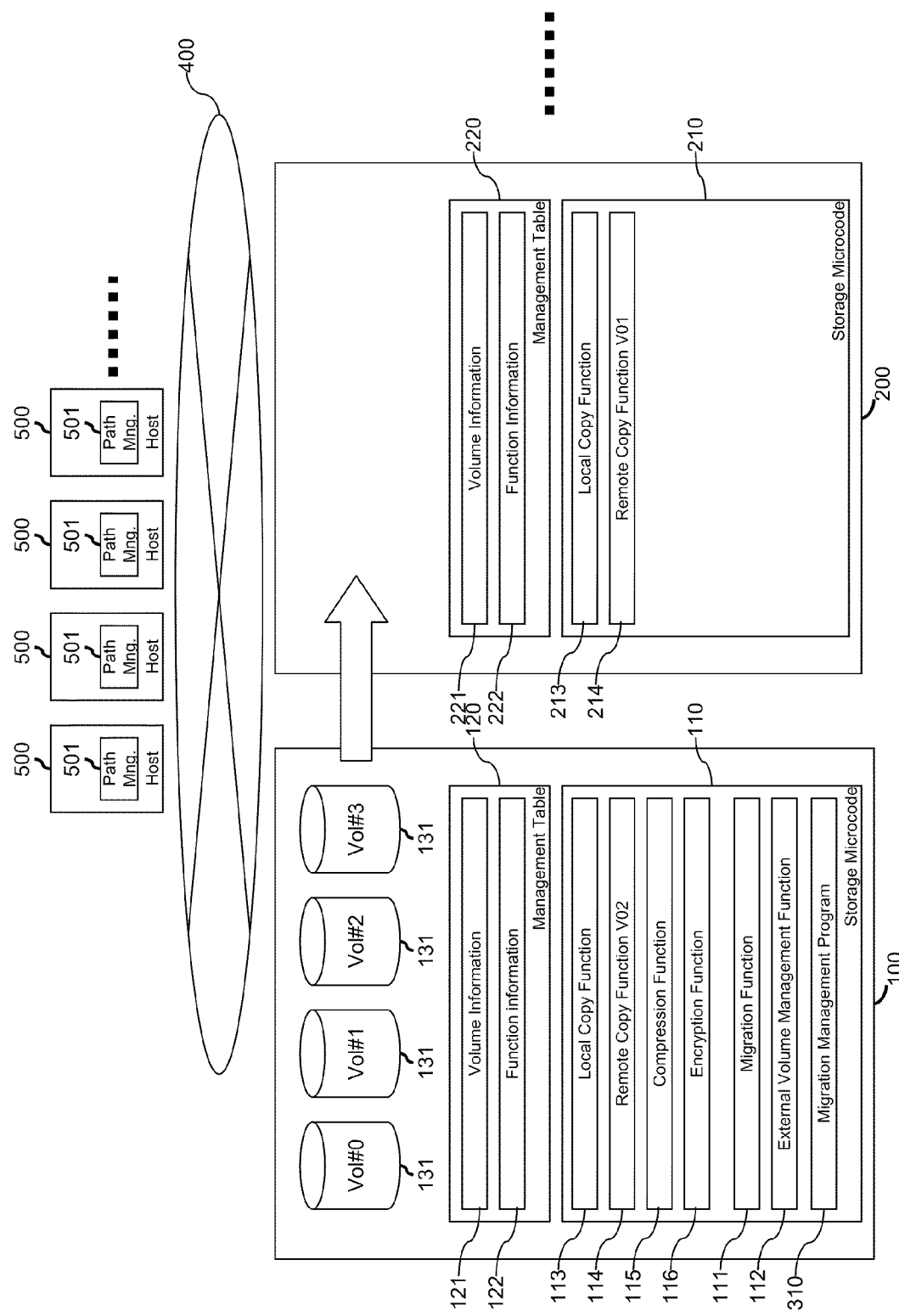
FIG. 9 illustrates an example of overview of a configuration of the invention.

FIG. 9 illustrates the configuration of a system in which the method and apparatus of the invention may be applied. The storage subsystem 100 has program to perform Migration Management 310. This program would gather information of the compatibility with the storage volume subject as a target for migration or mounting. This information corresponding to the storage management table 321 in FIG. 1 may be stored in the memory of the storage subsystem 100. Migration Management Program 310 would also gather information of the network capability between the host computers 500 and the storage subsystems 100, 200. This information corresponding to the network management table 322 in FIG. 1 may be stored in the memory of the storage subsystem 100.

Third Embodiment

While in the first embodiment, the migration was conducted by the program in the storage subsystem 100, the second embodiment demonstrates that the migration is conducted by the program in the second subsystem. Only the differences with the first embodiment will be explained by using FIGS. 10 to 11.

Figure 10:
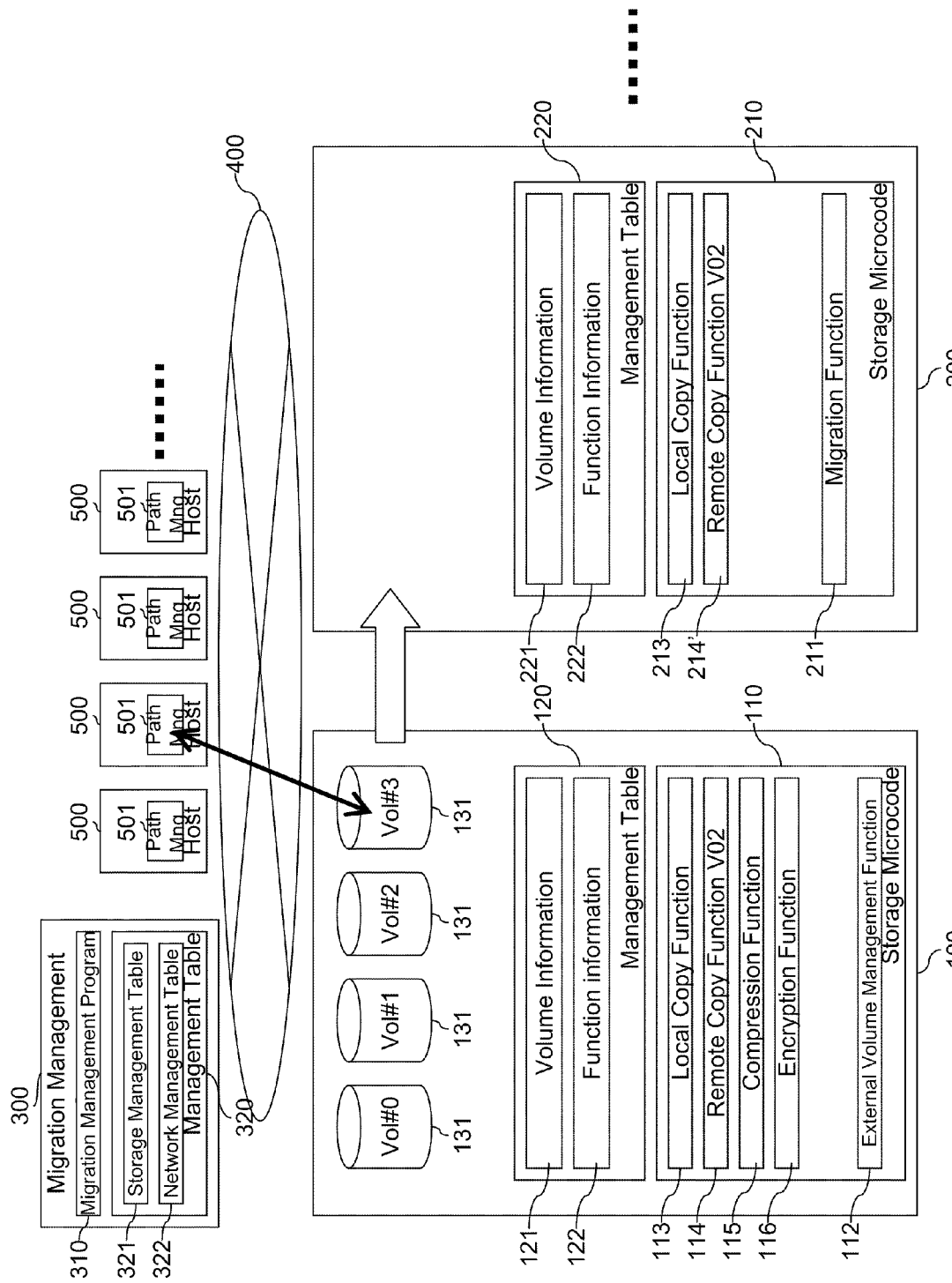
FIG. 10 illustrates an example of overview of a configuration of an invention.

FIG. 10 illustrates the configuration of a system in which the method and apparatus of the invention may be applied. The storage subsystem 200 has program to perform Migration 211 rather than the storage subsystem 100. The version of the Remote Copy Function 214' of storage subsystem 200 is same as the one in the storage subsystem 100, thus Volume number 3 may be migrated in this embodiment. In the first embodiment the remote copy function was not compatible, thus Volume number 3 had to be mounted instead of migrating the volume.

FIG. 11 illustrates an example of a process flow of the Migration Management Program 310' in the Migration Management Server 300 of FIG. 10. The program performs the same steps from the start at 310-0 to the end at 310-9 except for step 310-7'. In step 310-7', the program calls the Migration Function 211 to copy data of the source volume to the target volume, and to change the host path from the source volume to the target volume. Then, the program proceeds to step 310-9. Thus, unlike the first embodiment, which the storage controller in the storage subsystem 100 takes control of the migration by pushing the data of the source volume out to the target volume, in this embodiment the storage controller in the storage subsystem 200 takes control of the migration by pulling the data from the source volume to the target volume. This could save the load of the storage controller in the storage subsystem. Thus, in case if both the storage subsystems 100, 200 has the migration function, the Migration Management Program 310' may determine which storage controller should conduct the migration function based on the load of the two storage controllers and instruct the storage controller in charge of providing the migration function.

The present invention provides a system controlling data between heterogeneous storage systems providing different storage functions. The invention effectuate the control between the storage systems, while maintaining the storage function applied to the storage volumes. Having described my invention, however, many modifications thereto will become apparent to those skilled in the art to which it pertains without deviation from the spirit of the invention as defined by the scope of the appended claims.

The invention claimed is:

1. A system comprising:
   a first storage system including a first storage controller including a plurality of programs stored in a first memory, and a plurality of first storage volumes provided to a host computer;
   a second storage system including a second storage controller including a plurality of programs stored in a second memory; and
   a management server including a migration program stored in a third memory,
   wherein said migration program gathers information on storage functions available on both first and second storage systems, and determines whether to change control of data subject to migration from said first controller to said second controller, or to mount a volume of said second storage system as an external volume to said first storage system based on said gathered information.

2. The system according to claim 1,
   wherein said information on storage functions includes information of compatibility.

3. The system according to claim 1,
   wherein said migration program obtains information of remaining capacity of the second storage system available and capacity required to migrate data of the first storage system to the second storage system,
   wherein if the remaining capacity of the second storage system does not exceed the capacity required to migrate data of the first storage system to the second storage system, said second storage system is mounted to said first storage system so that a volume of said second storage system is provided as an external volume to said first storage system.

4. The system according to claim 3,
   wherein said remaining capacity of the second storage system available is provided by calculating a licensed capacity minus used capacity of each storage function of the second storage system, which was used in the first storage system.

5. The system according to claim 3,
   wherein said migration program determines whether to change control of data subject to migration from said first controller to said second controller or by mounting a volume of said second storage system as an external volume to said first storage system in units of a volume.

6. The system according to claim 1,
   wherein said migration program obtains information on whether the second storage system is accessible from the host computer,
   wherein if the second storage system is not accessible from the host computer, said second storage system is mounted to said first storage system so that a volume of said second storage system is provided as an external volume to said first storage system.

7. The system according to claim 1,
   wherein if said migration program determines to change control of data subject to migration from said first controller to said second controller, after the data migration is completed by using storage functions of said first or second storage systems, the host computer changes a path to a source volume of the first storage system to a target volume of the second storage system.

8. The system according to claim 7,
   wherein said migration program further determines whether to migrate data from said first storage system to said second storage system by using storage functions of said first storage system or by using storage functions of said second storage system, wherein if said migration program determines to migrate data from said first storage system to said second storage system by using storage functions of said first storage system, said migration program calls a program of said plurality of programs stored in said first memory to perform the migration.

9. The system according to claim 1, wherein said information on the storage functions are stored in the first and second storage systems, said information on the storage functions used in the first storage system is associated for each said first storage volume, and said information on the storage functions stored in the second storage system includes capacity available for each storage function.

10. A method for controlling data between a first storage system and a second storage system, comprising steps of:

maintaining information on storage functions used for each volume of a plurality of storage volumes on the first storage system, maintaining information on storage functions available on the second storage system;

receiving a request to migrate data of a source storage volume of said plurality of storage volumes on the first storage system to a target storage volume of said second storage system;

mounting said target storage volume to said first storage system, migrating data from said source storage volume to said target storage volume, and providing said target storage volume as an external volume to a host computer by a first controller of said first storage system if said target storage volume does not support the storage functions that was used by said source storage volume; and determining whether to change control of data subject to migration from said first controller to said second controller, or to mount said target volume as an external volume to said first storage system based on said maintained information for both first and second storage systems, wherein said first controller provides said source storage volume to said host computer before said migration of data from said source storage volume to said target storage volume.

11. The method according to claim 10, further comprising steps of:

mounting said target storage volume to said first storage system, migrating data from said source storage volume to said target storage volume, and providing said target storage volume as an external volume to said host computer by said first controller if said target volume cannot be accessed from said host computer.

12. The method according to claim 11, further comprising steps of:

mounting said target storage volume to said first storage system, migrating data from said source storage volume to said target storage volume, and providing said target storage volume as an external volume to said host computer by said first controller if remaining capacity of the target storage volume does not exceed a capacity required to migrate said source storage volume, and maintaining information of licensed capacity and capacity used for each storage function provided by said second storage system.

13. The method according to claim 12, further comprising steps of:

maintaining information of compatibility among said storage functions of said first and second storage systems.

14. The method according to claim 10, wherein if migration is conducted by using storage function of said first storage system, said first controller executes a program to perform said storage function, and after data migration is completed the host computer changes a path to said source volume to said target storage volume.

15. The method according to claim 10, wherein if migration is conducted by using storage function of said second storage system, a second controller of said second storage system executes a program to perform said storage function, and after data migration is completed the host computer changes a path to said source volume to said target storage volume.

* * * * *